United States Patent
Sauer

(10) Patent No.: US 6,198,447 B1
(45) Date of Patent: *Mar. 6, 2001

(54) PANE ANTENNA FOR AUTOMOBILES

(75) Inventor: Gerd Sauer, Stolberg (DE)

(73) Assignee: Saint-Gobain Vitrage International, Courbevoie (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/147,485

(22) Filed: Nov. 5, 1993

(30) Foreign Application Priority Data

Nov. 10, 1992 (DE) .................................. 42 37 818

(51) Int. Cl.[7] ....................................................... H01Q 1/32
(52) U.S. Cl. ........................................... 343/713; 343/713
(58) Field of Search ..................... 343/713; H01Q 1/32

(56) References Cited

U.S. PATENT DOCUMENTS

| | | | |
|---|---|---|---|
| 3,599,214 | * | 8/1971 | Altmayer ............................... 343/713 |
| 3,971,030 | * | 7/1976 | Sauer .................................... 343/713 |
| 5,220,336 | * | 6/1993 | Hirotsu et al. ........................ 343/713 |
| 5,255,002 | * | 10/1993 | Day ...................................... 343/713 |
| 5,285,210 | * | 2/1994 | Sato et al. ............................ 343/713 |
| 5,293,174 | * | 3/1994 | Kropielnicki et al. ............... 343/713 |

OTHER PUBLICATIONS

Roberts, Input Impedance of a Folded Dipole, RCA Review, Jun. 1947, pp. 289–300.*

* cited by examiner

*Primary Examiner*—Michael C. Wimer
(74) *Attorney, Agent, or Firm*—Oblon, Spivak, McClelland, Maier & Neustadt, P.C.

(57) ABSTRACT

A window pane antenna suitable for radio communication, for automobiles, consists of a loop-shaped antenna conductor (6) and of a conductive area (8) disposed in the edge zone of the glass pane (1). The feed point (7) of the antenna conductor (6) is disposed in the immediate vicinity of the conductive area (8, 9, 10) without connection to it. The other end (6') of the antenna conductor (6) is in electrically conducting connection with the conductive area (8, 9, 10). In comparison with known antenna structures for radio communication, the tuning behavior of this antenna structure is comparative insensitive to mechanical tolerances during installation of the antenna window pane.

6 Claims, 2 Drawing Sheets

PANE ANTENNA FOR AUTOMOBILES

BACKGROUND OF THE INVENTION

1. Field of the Invention

This invention relates to a pane antenna for automobiles, in which an antenna conductor is disposed on the surface of or inside an automobile glass pane. The antenna feed point is connected to the central conductor of a coaxial cable and is disposed in the vicinity of a conductive area located in the edge region of the glass pane and connected to the sheath of the coaxial cable.

2. Description of the Related Art

Antenna structures of this type are suitable as signal transmission antennas for radio communication, especially as antennas for digital radio telephone communication. For maximum transmission efficiency, such antennas must be precisely tuned. They require, for this purpose, a defined reference plane to which all electrical parameters are referred. As the reference plane, therefore, a strip-shaped, electrically conducting coating is disposed directly on the edge region of the glass pane.

An antenna structure of this type is known from WO 88/09569. In this known antenna, which is intended for use as a radio antenna, preferably for the frequency range from 890 to 960 MHz, the antenna conductor consists of a rectilinear conductor having a free end which projects from the edge of the glass pane into the viewing field of the glass pane. The antenna conductor having a conductive area and acting as a reference plane can be printed and baked onto the surface of the glass pane facing towards the interior of the vehicle, like heating conductors for heating panes.

The resonance frequency of this known antenna structure exhibits a certain dependence upon the materials of the glass pane and upon the geometrical tolerances necessary for installation of the glass pane. With these known antennas, therefore, it is still necessary to tune them again after installation if they are to possess an optimum efficiency.

SUMMARY OF THE INVENTION

It is an object of the present invention to provide a pane antenna of the initially named type, in which the dependence of the resonance frequency upon the materials used and upon the geometric and mechanical tolerances of the glass pane and of the window frame of the automobile body is further reduced.

According to the invention, this object is achieved by an antenna conductor having the form of a loop and connected at an end to a conductive area on the glass pane.

The antenna conductor of the antenna structure according to the invention is therefore formed as a folded unipole, one end of which is directly connected to a conductive area forming the reference potential. The antenna structure of this invention is substantially less sensitive to installation tolerance because, as a result of its direct connection to the conductive area, it is unambiguously earthed. It furthermore has the advantage that as a result of the ability to vary the width of the loop, it exhibits an additional degree of freedom of an impedance adaptation via the width of the loop.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a rear view of a monolithic safety glass with an antenna structure printed onto the surface and baked in;

DESCRIPTION OF THE PREFERRED EMBODIMENTS

Figure 1:
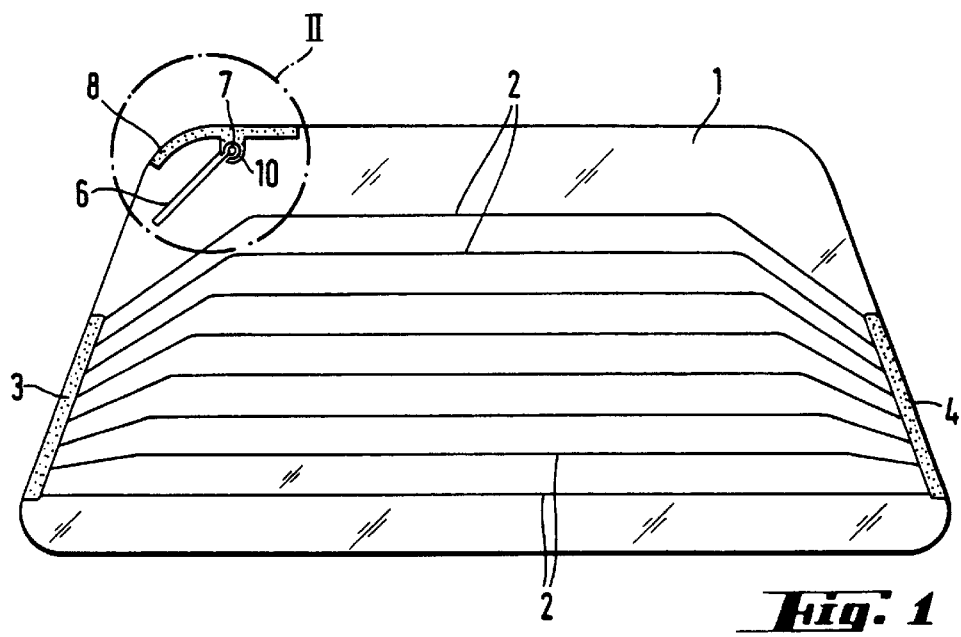
Figure 2:
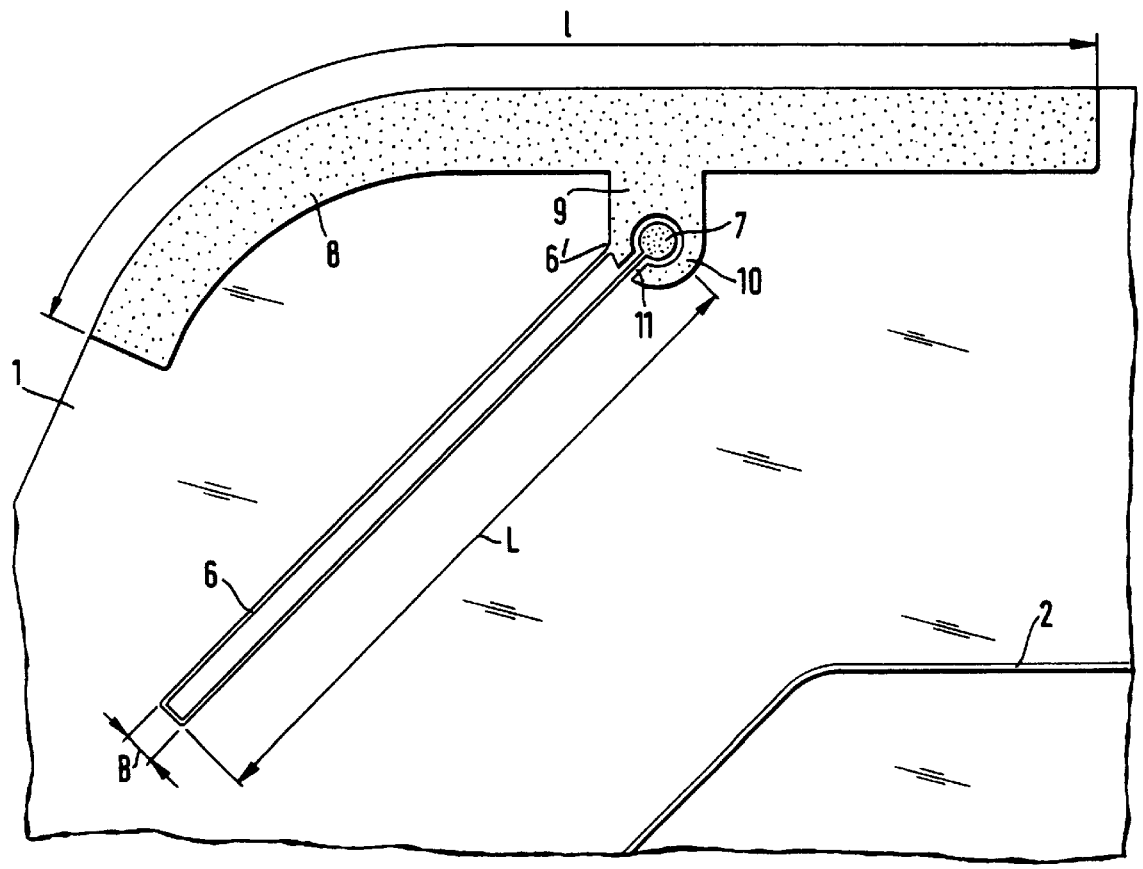
FIG. 2 is an enlargement of a portion of FIG. 1.

In FIGS. 1 and 2, a monolithic, thermally toughened glass pane 1, which is used as rear pane, is provided with a heating conductor structure. The heating conductor structure comprises a series of heating conductors 2 which extend transversely across the glass pane, and two collector conductors 3, 4 disposed laterally at the edge of the pane. Heating conductors 2 and collector conductors 3, 4 are of an electrically conducting bakable finish, so-call conducting silver, which is printed by the screen printing process onto the glass surface and is baked into the glass surface during the glass bending and/or toughening process.

In the upper region of the glass pane 1, in addition to the heating conductor structure and unconnected with it, is an antenna structure suitable for radio operation at a frequency in the 900 MHz range. This antenna structure is of the same material as the heating conductors 2 and the collectors 3, 4 and is printed onto the glass surface in the same printing operation as them, and is also baked in at the glass bending or toughening temperature. The antenna structure consists of an antenna conductor 6, approximately 0.5 mm wide and disposed in the shape of a loop, with the antenna feed point 7 in the form of a widened-out surface, to which the central conductor of a coaxial feed cable is connected. The length L of the conductor loop is, for example, 120 mm, while the width B of the conductor loop, that is to say the spacing of the two rectilinear conductor portions, disposed parallel to each other, is about 10 mm. The loop-shaped antenna conductor 6 is illustrated as being disposed in an upper corner zone of the glass pane 1 at an angle of about 45° to the horizontal, but it can be disposed at any other position on the glass pane and basically can be oriented at any angle to the horizontal. If conditions allow, the antenna conductor 6 is preferably orientated at a right angle to the horizontal.

The electrical counterbalance to the antenna conductor 6, formed as a folded unipole, is formed by the conductive area 8, which also is of the same electrically conducting baking finish as the heating conductors 2 and the antenna conductor 6, and is also applied on the glass surface in the same process step as the other conducting structures. The conducting area 8 consists of a strip, 1 to 3 cm wide, along the edge of the pane. The length 1 of this strip-shaped area 8 is not critical, but should preferably be at least about 120 mm. Approximately in its middle, the conductive area 8 has a flat projection 9 pointing towards the center of the surface of the pane, which forms at its end an annular area 10. The annular area 10 is provided with a radially orientated slit 11, through which the antenna conductor 6 extends. The feed point 7 is located inside the annular area 10 and concentric to it. The end region 6' of the loop-shaped antenna conductor 6 is connected to the projection 9 of the conducting area 8.

The heating conductor structure and the antenna conductor structure are on the surface of the glass pane facing towards the passenger space. If the glass pane is installed in the window frame of the automobile body by the bonding technique generally employed today, the conductive area 8 is connected to the adhesive bonding cord and, via the adhesive cord, to the metallic frame flange of the automobile body via a large-area connection. Since the adhesive compounds commonly used today have a certain electrical conductivity, the conductive area 8 is electrically conductingly connected to the body by a conductive adhesive layer. In this manner the antenna is directly electrically attached to the bodywork.

Figure 3:
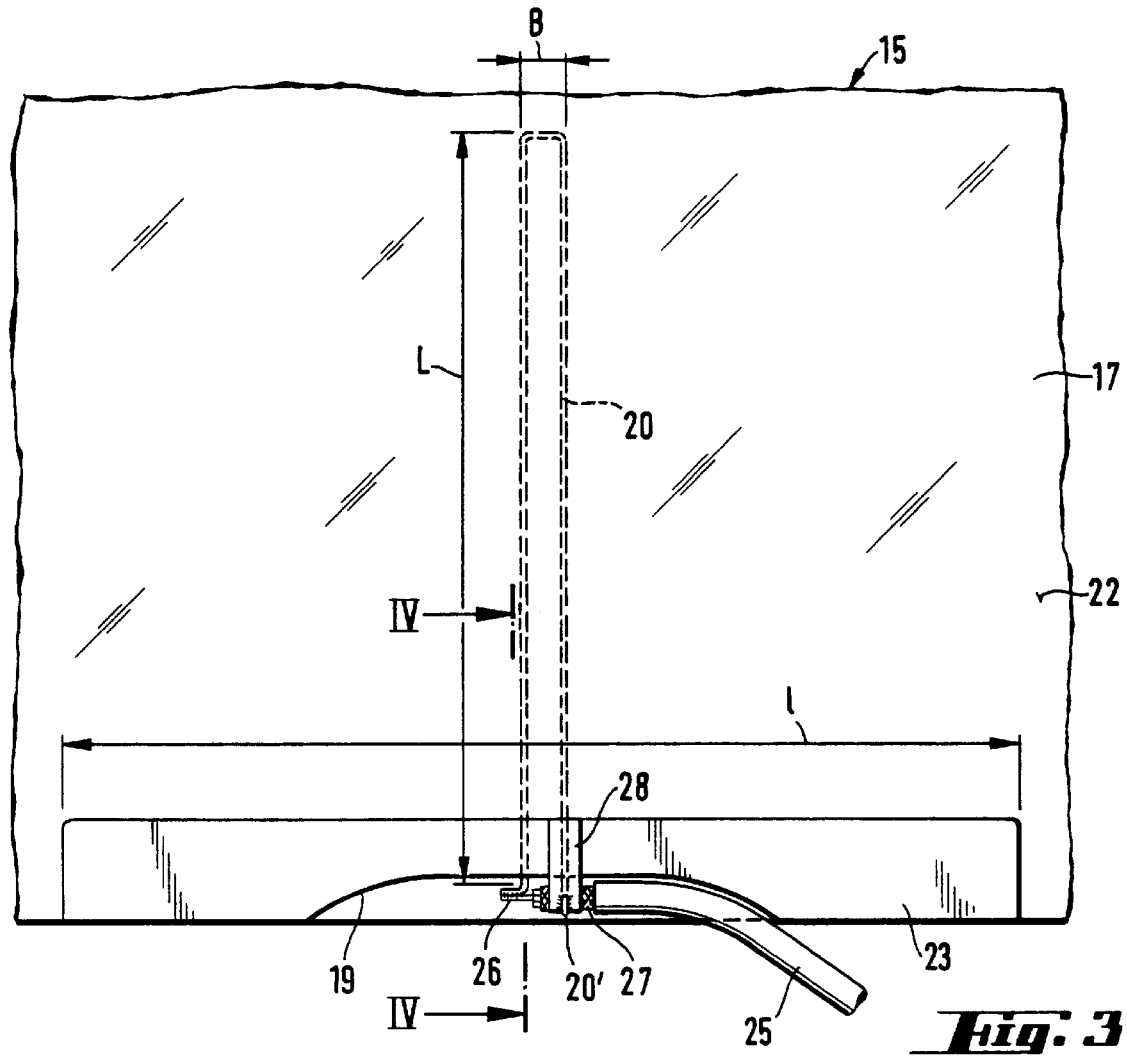
FIG. 3 shows a windscreen (windshield) of laminated glass, with an antenna wire laid therein, in elevation.
Figure 4:
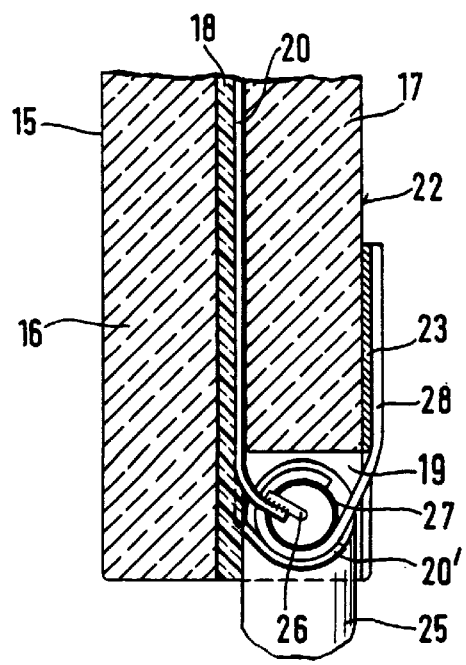
FIG. 4 is a section on the line IV—IV in FIG. 3.

In FIGS. 3 and 4 is illustrated a laminated glass pane 15 with a wire antenna constructed according to this invention. The laminated glass pane 15 consists of the single glass sheet 16, facing outwards in the installed condition, of the glass sheet 17 facing towards the passenger compartment, and of the thermoplastic intermediate layer 18 connecting the two glass sheets 16, 17 together. The inner glass sheet 17 is provided, at its lower edge, with an edge recess 19. In the thermoplastic intermediate layer 18 there is a metal wire 20 disposed in the form of a loop, that is in the shape of a folded unipole, the two ends of which project into the region of the edge recess 19. The length L of the wire loop 20 once again depends upon the transmission frequency and, for example, is once again 120 mm, while the width B of the wire loop 20 is once again about 10 mm.

Along the lower edge of the pane, on the free surface 22 of the laminated glass pane, is disposed a strip-shaped, electrically conducting area 23. This may be, for example, a coating of an electrically conducting paint or bakable electrically conducting finish. The electrically conducting area 23 may instead preferably be a metal foil which is firmly and permanently bonded to the glass surface 22. The area dimensions of the electrically conducting area 23 are again not critical, but the length of the metal foil should be at least about 120 mm.

In the embodiment illustrated, the antenna is disposed at the lower edge of the pane, but it may instead be disposed at any other desired position of the laminated glass pane. It has been found that especially good results are achieved if the antenna is disposed at the upper edge zone of the laminated glass pane.

Within the edge recess 19 is disposed the end of an antenna feed cable 25 in the form of a coaxial cable. One end of the conductor loop 20, i.e., the feed point of the antenna, is connected to the middle conductor 26 of the coaxial cable, while the other end 20' is connected with both the sheath 27 of the coaxial cable 25 and the conducting area 23. In order to make the electrical connection between the sheath 27 and the metal foil 23, a metal foil strip 28 is connected by soldering to both the metal foil 23 and the sheath 27 of the coaxial cable 25. The edge recess 19 is thereafter filled with a suitable age-hardening polymer and sealed in order to protect the junction point and to secure the coaxial cable 25 to the glass pane.

In the installed state of the laminated glass pane, the electrically conducting area 23 is again in electrically conducting connection over a large area, via the adhesive cord, with the metal frame of the automobile body, with the result that the antenna receives a clear reference potential.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An antenna incorporated into a vehicle glass pane, comprising:

a conductive area disposed adjacent an edge of the glass pane and electrically connected to a vehicle body via a conductive adhesive layer; and a conductive antenna element disposed on a surface of said glass pane and comprising a loop having one end comprising a feed point connected to a feed cable and disposed adjacent said conductive area and another end connected to the conductive area, wherein said conductive area includes an annular portion having a radial slit, wherein said feed point is located in said annular portion and a portion of said loop extends through said slit, and wherein the length of the conductive area is at least 120 mm.

2. The antenna of claim 1, including the feed cable comprising a coaxial cable having a central conductor connected to said feed point, wherein a sheath of the coaxial cable is connected to said conductive area.

3. The antenna of claim 2, wherein said conductive area and said conductive antenna element are located in the same plane on the surface of the glass pane and are comprised by an electrically conductive coating on a surface of the glass pane.

4. The antenna of claim 2, wherein the glass pane comprises a laminated glass pane, wherein said antenna element is a wire loop incorporated into an interior of said glass pane, and wherein said conductive area is formed on a surface of the glass pane facing an interior of the vehicle.

5. The antenna of claim 4, wherein said conductive area comprises a metal foil bonded to the surface of the glass pane.

6. The antenna of claim 5, including a metal foil strip connecting said conductive area to said sheath.

* * * * *